United States Patent
Raimarckers et al.

(10) Patent No.: US 11,530,643 B2
(45) Date of Patent: Dec. 20, 2022

(54) AIRCRAFT MACHINE PART INCORPORATING AT LEAST ONE PRESSURE SENSOR

(71) Applicant: Safran Aero Boosters S.A., Herstal (BE)

(72) Inventors: Nicolas Raimarckers, Tourinne (BE); Maxime Dumont, Herstal (BE); Rafael Perez, Boncelles (BE); Frédéric Vallino, Seraing (BE)

(73) Assignee: SAFRAN AERO BOOSTERS S.A., Herstal (BE)

( * ) Notice: Subject to any disclaimer, the term of this patent is extended or adjusted under 35 U.S.C. 154(b) by 561 days.

(21) Appl. No.: 16/592,583

(22) Filed: Oct. 3, 2019

(65) Prior Publication Data

US 2020/0109661 A1    Apr. 9, 2020

(30) Foreign Application Priority Data

Oct. 5, 2018  (BE) .................................. 2018/5683

(51) Int. Cl.
| | | |
|---|---|---|
| *F02B 77/08* | (2006.01) | |
| *G01L 19/00* | (2006.01) | |
| *G01L 7/08* | (2006.01) | |
| *B64D 47/00* | (2006.01) | |

(52) U.S. Cl.
CPC ............ *F02B 77/085* (2013.01); *B64D 47/00* (2013.01); *G01L 7/082* (2013.01); *G01L 19/0007* (2013.01); *G01N 2291/02872* (2013.01)

(58) Field of Classification Search
CPC .. F02B 77/085; F02B 2270/301; B64D 47/00; G01L 7/082; G01L 19/0007; F05D 2230/53; F05D 2240/121; F05D 2240/303; F05D 2270/80; F05D 2270/301; F05D 2270/3011; F01D 21/003; F01D 17/08; G01N 2291/02872
See application file for complete search history.

(56) References Cited

U.S. PATENT DOCUMENTS

| | | |
|---|---|---|
| 3,978,731 A | 9/1976 | Reeder et al. |
| 6,688,181 B1 | 2/2004 | Clerc et al. |
| | (Continued) | |

FOREIGN PATENT DOCUMENTS

| | | |
|---|---|---|
| DE | 102006046224 A1 | 4/2008 |
| FR | 2262288 A1 | 9/1975 |
| | (Continued) | |

OTHER PUBLICATIONS

International Search Report and Written Opinion dated Jul. 11, 2019, for Belgian Application No. 2018/5683, filed Oct. 5, 2018, 12 pages.

*Primary Examiner* — Atif H Chaudry
(74) *Attorney, Agent, or Firm* — Christensen O'Connor Johnson Kindness PLLC

(57) ABSTRACT

The disclosed technology concerns an aircraft turbomachine part comprising a part body drilled with at least one cavity open to the outside and at least one conduit joining the cavity on the one hand and leading to the outside on the other hand. Each cavity receives a pressure sensor, and the conduit corresponds to the cavity guides the cables connected to the sensor to the outside of the part body. The part is an aircraft turbomachine vane.

15 Claims, 4 Drawing Sheets

(56) References Cited

U.S. PATENT DOCUMENTS

| | | | |
|---|---|---|---|
| 7,600,430 B2* | 10/2009 | Palin | G01C 5/06 368/11 |
| 2010/0107774 A1 | 5/2010 | Kurtz | |
| 2014/0182292 A1 | 7/2014 | Hudon et al. | |
| 2019/0078869 A1* | 3/2019 | Warren | F01D 21/003 |

FOREIGN PATENT DOCUMENTS

| | | | |
|---|---|---|---|
| FR | 2786564 A1 | | 6/2000 |
| JP | 2004011458 A | * | 1/2004 |

* cited by examiner

AIRCRAFT MACHINE PART INCORPORATING AT LEAST ONE PRESSURE SENSOR

CROSS REFERENCE TO RELATED APPLICATION

This application claims priority under 35 U.S.C. § 119 to Belgian Patent Application No. 2018/5683, filed Oct. 5, 2018, the entirety of which is hereby incorporated by reference.

TECHNICAL FIELD

The disclosed technology concerns a part intended to be part of an aircraft turbomachine. The part incorporates at least one pressure sensor.

BACKGROUND

When attempting to measure the pressure in an area of an aircraft turbomachine, it is interesting to place a pressure sensor in that area. A disadvantage of such a sensor is that its presence, and in particular the presence of its protective housing diverts air flow and disrupts the measurement.

In addition, when a sensor is fixed to an external surface of a part of the turbomachine, this fixing must be extremely strong in view of the pressure exerted by the air flows. This fixing therefore requires a lot of fixing material, for example glue, which further increases the aerodynamic impact of the sensor and wire assembly.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One of the purposes of the present disclosure is to provide a technique for making pressure measurements in an area of an aircraft turbomachine that causes little disturbance to the air flow in the area.

For this purpose, the present disclosure proposes a part for an aircraft turbomachine comprising a part body, a first pressure sensor and a first cable mechanically and electrically connected to the first sensor.

In an embodiment, the part body comprises:
  a first cavity leading to the outside of the part body through a first opening, and
  a first conduit leading to the first cavity on the one hand and to the outside of the part body on the other hand.

In an embodiment, the first sensor is at least partially housed in the first cavity and the first cable being at least partially housed in the first conduit.

In an embodiment, the first sensor comprises a first membrane, the first sensor being arranged so that at least a portion of the first membrane is part of the outer surface of the first sensor.

In the present disclosure, the outer surface of the first sensor includes, for example, at least a portion of the first membrane. Consequently, the first sensor does not include a protective housing located in front of the first membrane and on the sides of the first sensor. Indeed, since the first sensor is housed in a cavity in a part of the turbomachine, it does not need a protective housing that would increase its volume since the part body provides the sensor with excellent lateral protection.

The fact that the sensor is located inside a part of the turbomachine and not fixed on an external surface of a part of the turbomachine makes it possible to avoid having to fix it with a large quantity of glue. This also ensures that the fixing of the sensor to the part body is particularly strong and particularly resistant to air flow.

The part according to the present disclosure also provides good protection for the cable(s) connected to the first sensor since they are at least partially located in the first conduit, inside the part body.

In an embodiment, the first conduit connects the first cavity and the outside of the part body. In an embodiment, the first cavity leads to a first surface of the part body and the first conduit leads to a second surface of the part body, different from the first surface.

Avoiding any detachment of the sensor and/or cable is particularly advantageous because if a component were to come off, it could damage downstream components.

In a first embodiment of the present disclosure, the part of the turbomachine is a component of an aircraft turbomachine, i.e. an existing part of the turbomachine, for example a vane, a ferrule or an annular separator. The shape of the component may then need to be modified to include a protrusion to include the sensor. In a second embodiment of the present disclosure, the part of the turbomachine is a measuring module that is arranged in the turbomachine.

In an embodiment, the first membrane is located at one end of the first sensor. In an embodiment, the first membrane is located opposite the first opening. In an embodiment, the first membrane should be flush with the end of the first sensor. In an embodiment, the first membrane is directly in the first cavity in the sense that there is no separation between the first membrane and the inner wall of the first cavity.

The first conduit forms a narrowing of the first cavity. Thus, the surface area of a section of the first conduit is smaller than the surface area of a section of the first cavity.

In an embodiment, the first sensor does not include a protective housing located in front of the first membrane and/or on the sides of the sensor. The sensor can be 1.2 mm wide, for example. In an embodiment, the first sensor is completely housed in the first cavity. In an embodiment, the sensor(s) used in the present disclosure are also suitable for measuring a temperature. The sensor is, for example, piezoresistive. In an embodiment, the first cavity has such dimensions that the first sensor is at least partially housed in an adjusted manner therein. The space between the inner lateral walls of the first cavity and the outer lateral walls of the first sensor can be filled with a fixing material, such as an adhesive material.

The part, for example, has a mechanical and/or aerodynamic function in the turbomachine.

In an embodiment of the present disclosure, the part also comprises a first grid located between the outside of the part body and the first sensor.

The grid allows the air to pass through the first membrane of the first sensor while protecting it. The grid is, for example, located between the first opening and the membrane of the sensor. The grid is, for example, parallel to the membrane of the sensor. The grid is, for example, fixed to the part body. Thus, The grid is, for example, coupled mechanically indirectly to the sensor via the part body. In an embodiment, the membrane is only separated from the outside of the part body by the grid.

In an embodiment of the present disclosure, the first cavity comprises an enlargement, the grid being received in the enlargement.

The enlargement is a portion of the cavity that is flared. This makes it possible to fix the grid to the part body particularly well.

In an embodiment of the present disclosure, the part body is monobloc. This makes it possible to integrate a sensor into a monobloc component.

In an embodiment of the present disclosure, the part comprises a protrusion, the first cavity being located at least partially in the protrusion. It may happen that the sensor is wider than the usual width of the part body in which the sensor is integrated. Therefore, a protrusion in the part body creates a cavity large enough to house the sensor.

In an embodiment of the present disclosure, the part further comprises a second cable mechanically and electrically connected to the first sensor. The second cable is at least partially housed in the first conduit.

In an embodiment of the present disclosure, the first conduit includes at least one curve or bend. In other words, the conduit, for example, includes at least one change of direction.

In an embodiment of the present disclosure, the part also includes a second pressure sensor and a third cable mechanically and electrically connected to the second sensor.

In an embodiment, the part body comprises:
a second cavity leading to the outside of the part body through a second opening, and
a second conduit leading to the second cavity on the one hand and into the first conduit on the other hand.

In an embodiment, the second sensor being at least partially housed in the second cavity and the third cable being partially housed in the second conduit and partially housed in a portion of the first conduit, and the second sensor comprises a second membrane, the second sensor being arranged so that at least a portion of the second membrane is part of the outer surface of the second sensor.

In an embodiment, the second membrane is located at one end of the second sensor.

In an embodiment, the second opening is inclined with respect to the first opening.

Having several sensors fixedly located in the same part allows sensors to be placed at given angles and positions. The fact that the second conduit leads to the first conduit allows the cables to be gathered inside the part body. This simplifies the manufacture of the part and its assembly with a data processing unit that is connected to the cables.

In an embodiment of the present disclosure, the part body has a dome shape, the second opening being inclined with respect to the first opening.

A dome, which can be included in a cone or mushroom shape, allows sensors to be placed at different angles and to maintain their respective positions. It thus forms a measuring module in the turbomachine.

The present disclosure also proposes an aircraft turbomachine component, for example a vane, comprising a part according to the present disclosure and whose part body has a dome shape.

In an embodiment of the present disclosure, the part forms a vane of the aircraft turbomachine. The vane can, for example, be part of a compressor in the aircraft turbomachine.

In an embodiment of the present disclosure, the first cavity is located in a leading edge of the vane. In an embodiment, the second cavity is also located in the leading edge of the vane. It is possible that the part forming a vane may include several sensors aligned in the direction of the leading edge and/or several sensors aligned in a plane perpendicular to the direction of the leading edge.

It is also possible that a vane, annular separator, ferrule or other portion of an aircraft turbomachine may include a dome-shaped part according to the present disclosure.

The present disclosure also proposes an aircraft turbomachine or a portion of an aircraft turbomachine comprising a part according to any of the embodiments of the present disclosure.

The turbomachine or a portion of the turbomachine, for example a compressor, can thus be easily tested in a test bench such as a wind tunnel. A compressor comprising a part according to the present disclosure can be tested on a compressor bench.

The present disclosure also proposes a method of manufacturing a part according to any one of the embodiments of the present disclosure or a turbomachine according to any one of the embodiments of the present disclosure. The method comprises, for example, a three-dimensional printing or additive manufacturing of the part body, inserting the first sensor into the first cavity and inserting of the first cable into the first conduit.

If there is a second cable, it is, for example, inserted into the first conduit. If there are several sensors, they are placed in the same way, and so are the cables.

The advantages mentioned for the device apply mutatis mutandis to the method.

The present disclosure also proposes a method of manufacturing a turbomachine according to any of the embodiments of the present disclosure, the method comprising manufacturing the part, calibrating the first sensor and assembling the part with other components of the aircraft turbomachine.

DESCRIPTION OF THE DRAWINGS

The foregoing aspects and many of the attendant advantages of claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In the context of this document, the terms "first" and "second" are used only to differentiate between the different components and do not imply an order between them. In addition, a device according to the present disclosure may include a "third" component without having a "second" component.

Figure 1:
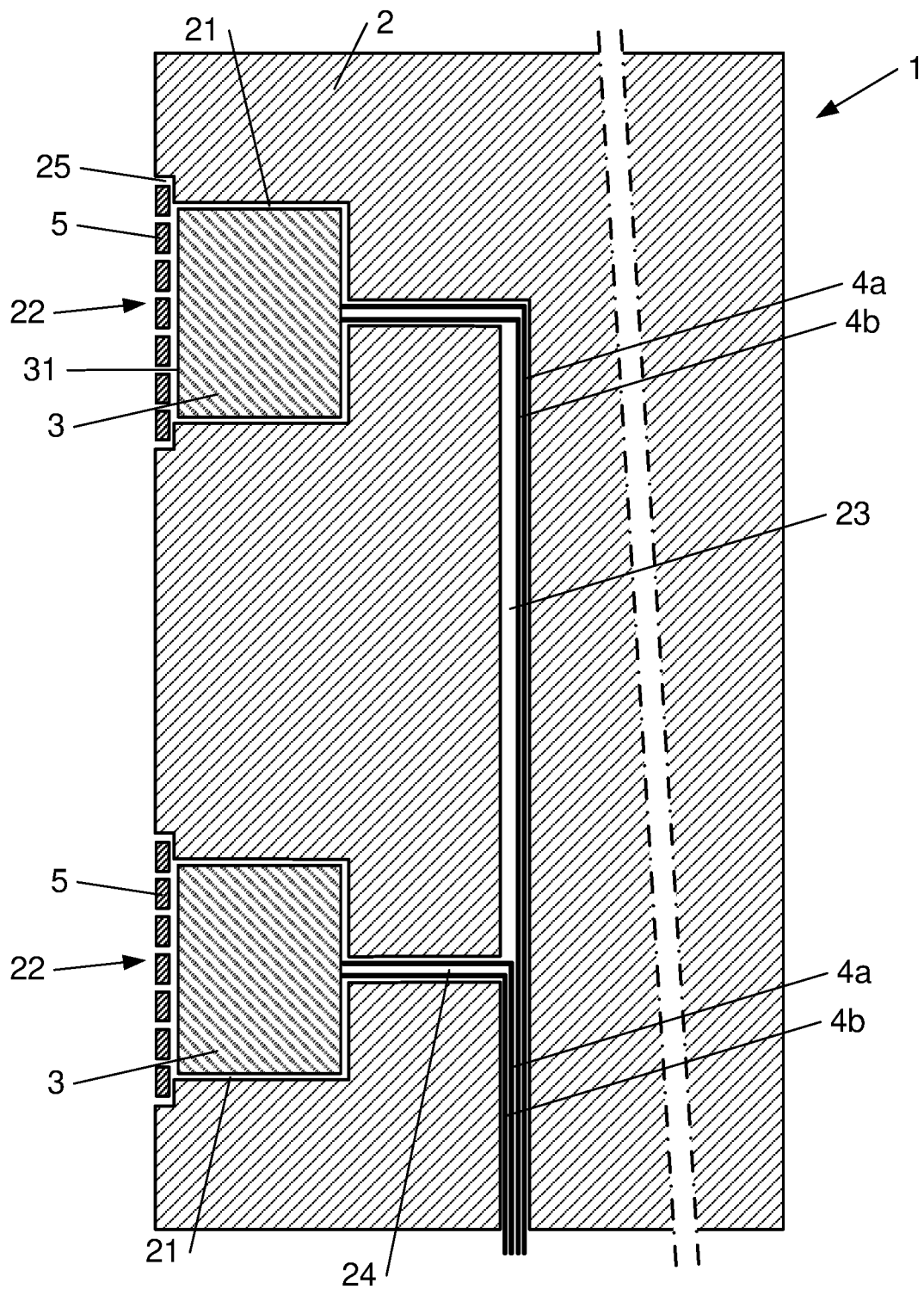
FIG. 1 is a schematic cross-sectional view of a part for an aircraft turbomachine according to an embodiment of the present disclosure.

FIG. 1 is a schematic cross-sectional view of a part 1 for an aircraft turbomachine according to an embodiment of the present disclosure. In the example depicted, the part 1 includes a part body 2, which is, for example, monobloc. The part 1 includes a first pressure sensor 3 and a first cable 4a mechanically and electrically connected to the first sensor 3. In addition, it may include a second cable 4b mechanically and electrically connected to the first sensor 3.

The part 1, for example, includes a second pressure sensor 3 and a third cable 4a mechanically and electrically connected to the second sensor 3. In addition, it may include a fourth cable 4b mechanically and electrically connected to the second sensor 3. Although FIG. 1 represents only two cables per sensor, a part 1 according to the present disclosure may include two, three, four, five or more cables for each sensor.

The part body 2 has a first cavity 21 that houses the first sensor 3, and, for example, a second cavity 21 that houses the second sensor 3. The first cavity 21 opens to the outside of the body 2 through a first opening 22. The second cavity 21 opens to the outside of the body 2 through a second opening 22.

The part body 2 has a first conduit 23 that forms a channel between the back of the first cavity 21 and the outside of the body 2, and houses at least a portion of the first cable 4a. In an embodiment, the first conduit 23 houses at least a portion of the second cable 4b. The first conduit 23 can be curved or inflected to guide the cable(s) 4a, 4b in a direction appropriate for connection to a data processing unit. The data processing unit can be implemented as software, as hardware, or as a combination of hardware and software. In an embodiment, the data processing unit includes combinations of circuits and computer program products having software or firmware instructions stored on one or more computer readable memories that work together to cause a device to perform, for example, data processing or other methodologies or technologies described herein.

In an embodiment, the part body 2 has a second conduit 24 that forms a channel between the back of the second cavity 21 and the first conduit 23, and that houses a first portion of the third cable 4a. In an embodiment, the second conduit 24 houses a first portion of the fourth cable 4b. A second portion of the third cable 4a and potentially a second portion of the fourth cable 4b are housed in a portion of the first conduit 23.

The part 1, for example, includes a grid 5 for each cavity 21. The grid 5 is located between the outside of the body 2 and the membrane of the sensor 3. It is, for example, received, at least partially, in an enlargement 25 of the cavity 21.

The part 1 can, for example, be manufactured as follows. The part body 2 is first manufactured by an additive method of manufacturing. Then, the first sensor 3 is inserted into the first cavity 21 through the first opening 22 and each cable 4a, 4b is inserted into the first conduit 23. The insertion of each cable 4a, 4b in the first conduit 23 can be facilitated by attaching a guide component to the cable(s), for example, more rigid and/or wider than the cable(s) in order to guide the cable(s) in the first conduit 23. This guide component can then be detached from the cable(s).

Following its manufacture, it is possible to calibrate the sensor(s) before assembling the part 1 with other components of the aircraft turbomachine.

Figure 2:
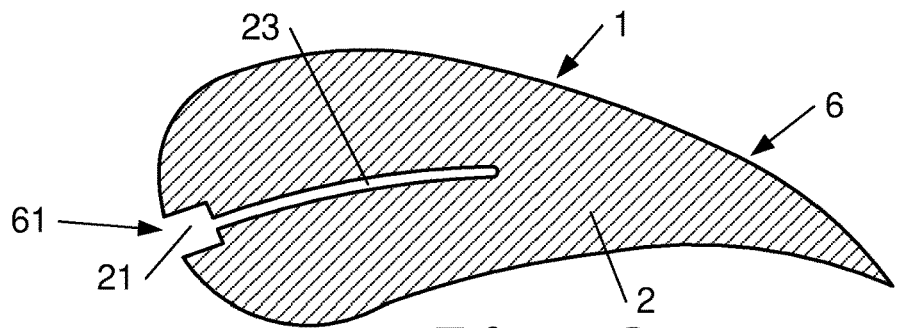
FIG. 2 is a cross-sectional view of a vane forming a part according to an embodiment of the present disclosure.
Figure 3:
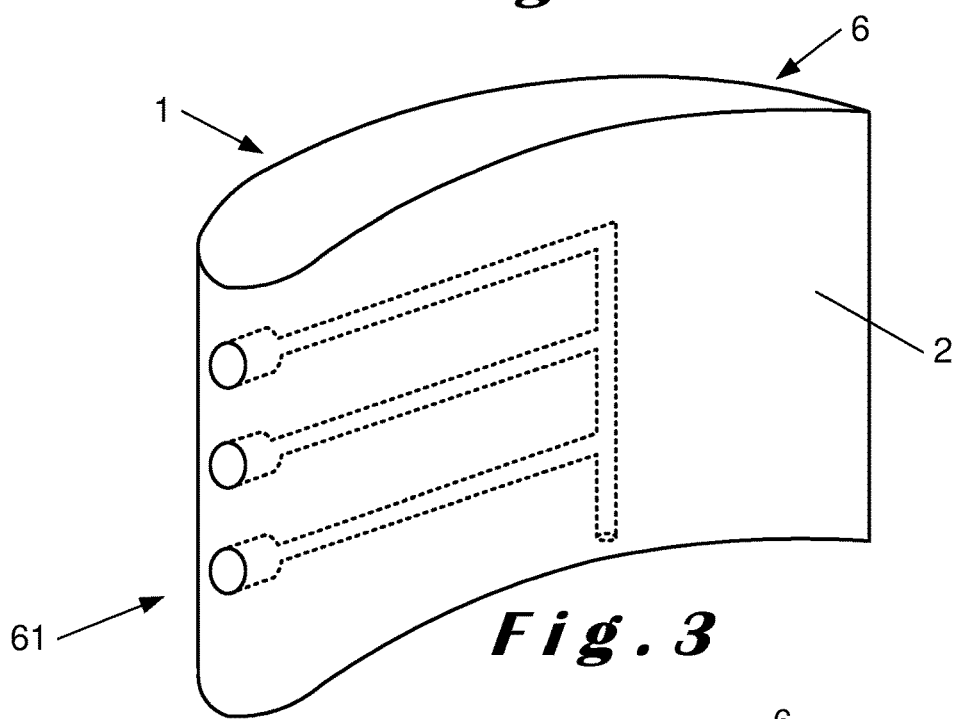
FIG. 3 is a three-dimensional view of a vane forming a part according to an embodiment of the present disclosure.

FIG. 2 is a cross-sectional view of a vane 6 forming a part 1 according to an embodiment of the present disclosure. FIG. 3 is a three-dimensional view of a vane 6 forming a part 1 according to an embodiment of the present disclosure.

In the vane 6 shown in FIGS. 2 and 3, the cavities 21 are located on a leading edge 61. In FIG. 2, the first conduit 23 extends in a plane perpendicular to that of the figure.

Figure 4:
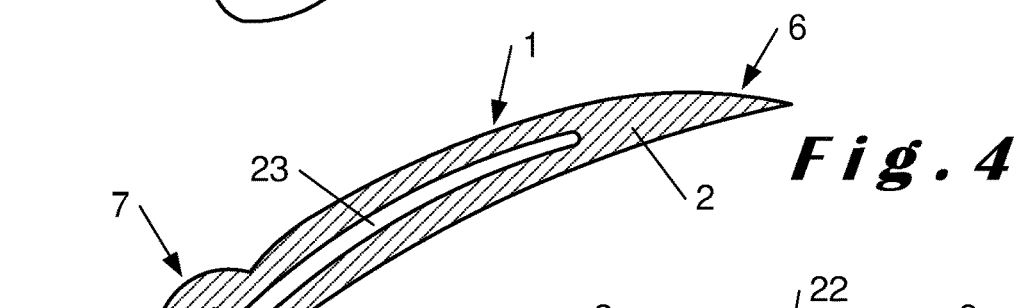
FIG. 4 is a cross-sectional view of a vane forming a part according to an embodiment of the present disclosure.

FIG. 4 is a cross-sectional view of a vane 6 forming a part 1 according to an embodiment of the present disclosure. This figure illustrates that the part 1, for example, the part body 2, may include a protrusion 7 in which the first cavity 21 is located. The protrusion 7 forms an enlargement of the part body 2. For example, the vane 6 can have a thickness of about 1 mm outside of the protrusion 7 and a thickness of about 1.4 mm at the level of the protrusion 7. This protrusion 7 can be present regardless of the shape of the part 1.

In FIG. 4, the first conduit 23 extends in a plane perpendicular to that of the figure.

Figure 5:
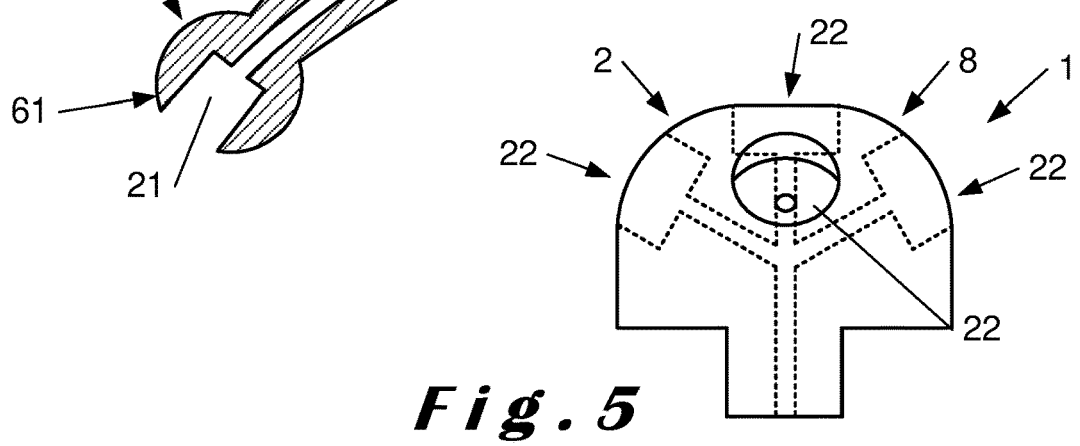
FIG. 5 is a front view of a part whose part body has a dome shape.

FIG. 5 is a front view of a part 1 whose part body 2 has a dome shape 8. For example, the part 1 may include five sensors, although only four cavities 21 are visible in FIG. 5. In an embodiment, at least two of the openings 22 of the cavities 21 are inclined to each other. The part 1 shown in FIG. 5 is a measurement module intended to be placed in the turbomachine. It is possible, whatever the embodiment of the present disclosure, that the part 1, particularly if it is a measurement module as shown in FIG. 5, may include three, four, five, five, six or more sensors, each in a cavity in the part body.

For clarity, some components of the part 1 have not been shown in FIGS. 2 to 5.

Figure 6:
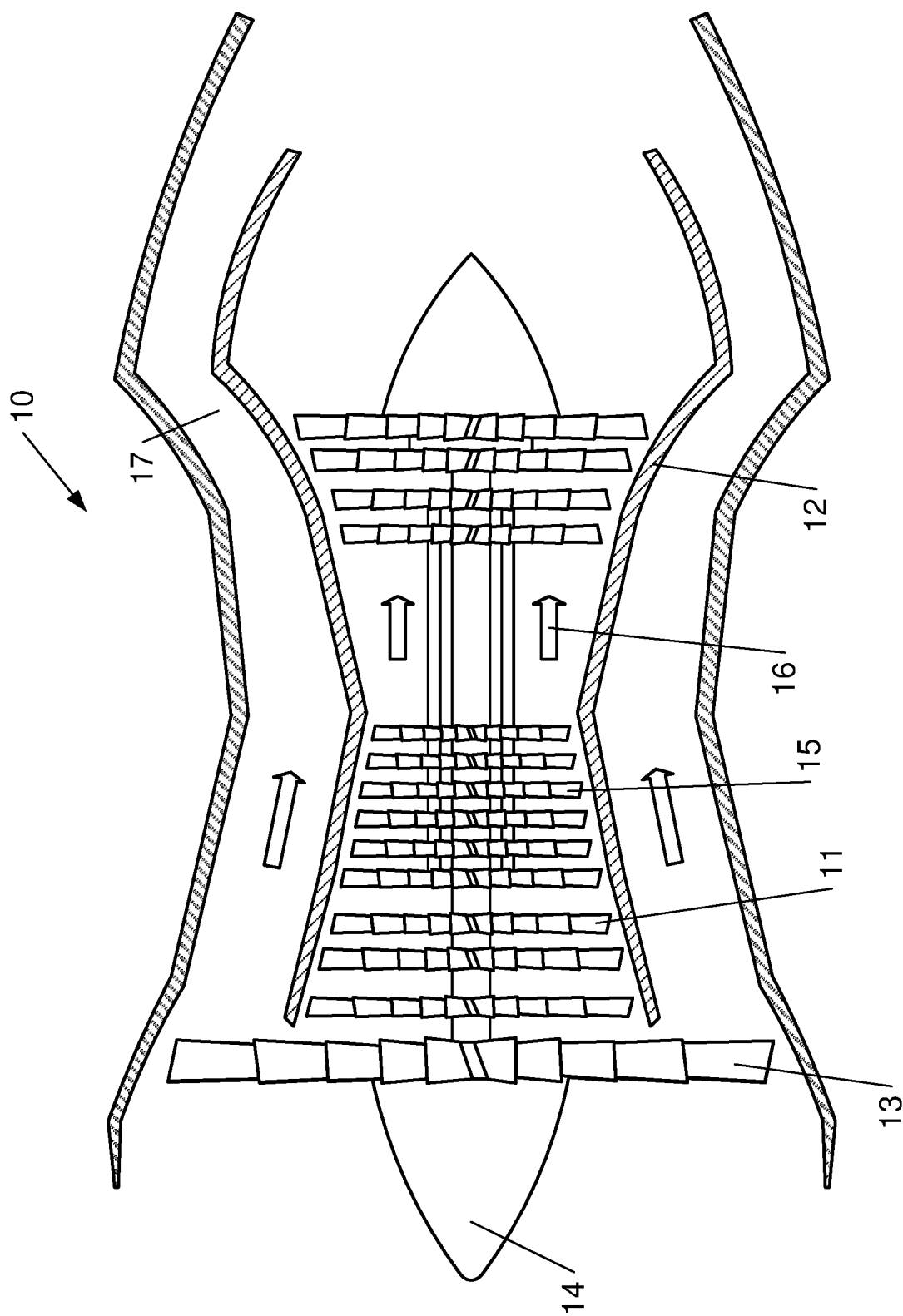
FIG. 6 is a cross-sectional view illustrating components of an aircraft turbomachine capable of including a part according to the present disclosure.

FIG. 6 is a cross-sectional view illustrating components of an aircraft turbomachine 10 capable of including a part 1 according to the present disclosure. The turbomachine 10 includes: a front cone 14, a fan 13, an annular separator 12, a low pressure compressor 11, and a high pressure compressor 15. The annular separator 12 separates a primary air flow 16 and a secondary air flow 17.

A part 1 according to any embodiment of the present disclosure can form any component of the aircraft turbomachine 10. For example, it can be a stator or rotor vane 6 or a ferrule 63 of the low-pressure compressor 11 or high-pressure compressor 15, or it can be the annular separator 12. A part 1 according to any embodiment of the present disclosure can form a measurement module, for example by comprising several sensors 3 fixed to the part body 2, which can for example have the shape of a dome.

Figure 7:
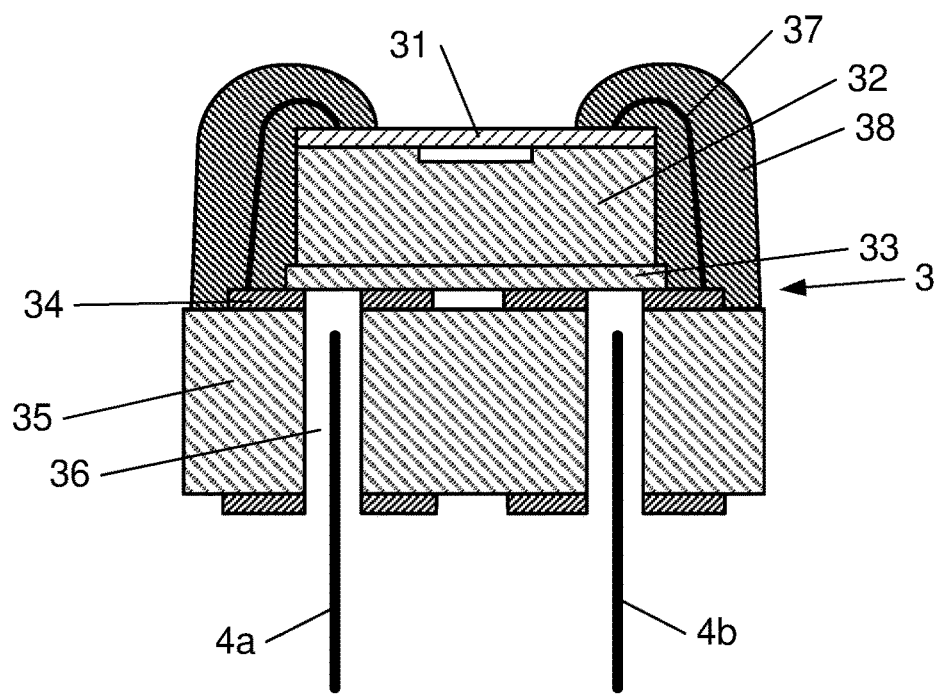
FIG. 7 is a cross-sectional view of a sensor 3 included in an embodiment of the present disclosure.

FIG. 7 is a cross-sectional view of a sensor 3 included in an embodiment of the present disclosure. The sensor 3 shown in FIG. 7 can be the first, second or any pressure sensor of a part 1 according to the present disclosure.

The sensor 3 includes a membrane 31. As the sensor 3 does not include a protective housing in front of the membrane 31 and on the sides of the sensor 3, a portion of the membrane 31 is part of the outer surface of the sensor 3.

In an embodiment, the sensor 3 also includes a detection device 32 to which the membrane 31 is fixed. The detection device 32 is fixed on a printed circuit board 35 by a non-conductive glue 33. The detection device 32 is connected to conductor tracks 34 of the printed circuit board 35 by conductor wires 37. The conductor wires 37 are encapsulated by an encapsulant 38. The conductor tracks 34 are connected to the first 4a and second 4b cables, which, for example, pass through holes 36 in the printed circuit board 35.

Figure 8:
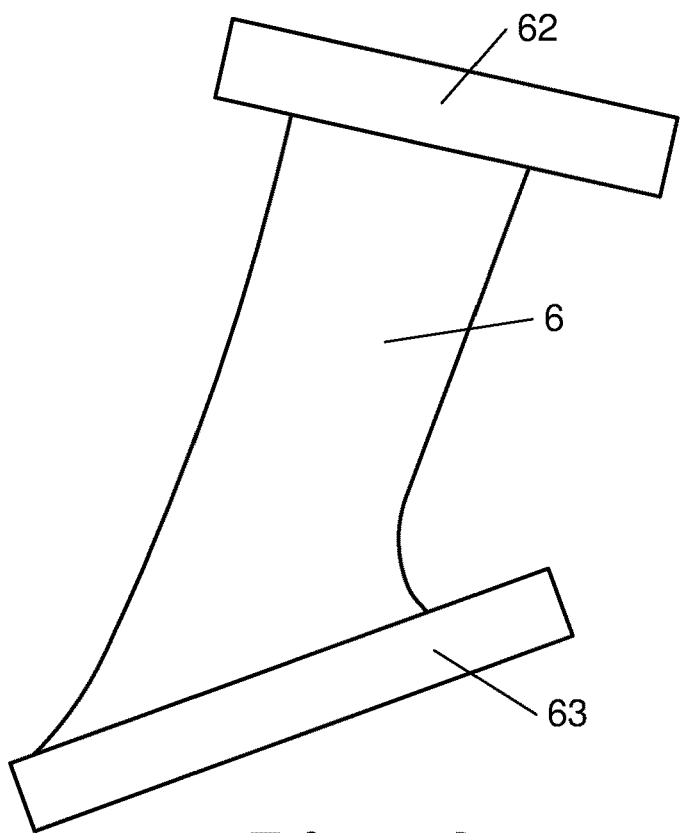
FIG. 8 shows an arrangement of a vane in an aircraft turbomachine capable of including a part according to the present disclosure.

FIG. 8 shows an arrangement of a vane 6 in an aircraft turbomachine capable of including a part according to the present disclosure. The vane 6 is fixed on one hand to a housing 62 and on the other hand to a ferrule 63.

In other words, embodiments of the present disclosure refer to an aircraft turbomachine part 1 comprising a part body 2 drilled with at least one cavity 21 open to the outside and with at least one conduit 23 joining the cavity 21 on the one hand and leading to the outside on the other hand. Each cavity 21 receives a pressure sensor 3, and the conduit 23 corresponds to the cavity 21 guides the cables 4a, 4b connected to the sensor 3 to the outside of the part body 2. The part 1 is an aircraft turbomachine vane 6.

The present technology has been described in relation to specific embodiments, which are purely illustrative and should not be considered restrictive. In general, the present technology is not limited to the examples illustrated and/or described above. The use of the verbs "comprise", "include", or any other variant, as well as their conjugations, cannot in any way exclude the presence of components other than those mentioned. The use of the indefinite article, "a", "an", or the defined article "the", to introduce a component does not exclude the presence of a plurality of these components. Also, the reference numbers in the claims do not limit their scope.

In some embodiments, one or more of components set forth herein may include hardware circuit implementations (e.g., implementations in analog circuitry, implementations in digital circuitry, and the like, and combinations thereof) to cause a device to perform one or more methodologies or technologies described herein. In other embodiments, one or more of these components may include combinations of circuits and computer program products having software or firmware instructions stored on one or more computer readable memories that work together to cause a device to perform one or more methodologies or technologies described herein.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the present disclosure in which an exclusive property or privilege is claimed are defined as follows:

1. A part for an aircraft turbomachine comprising a part body, a first pressure sensor and a first cable mechanically and electrically connected to the first pressure sensor, the part body comprising:
   a first cavity leading to the outside of the part body through a first opening, and
   a first conduit leading to the first cavity on the one hand and to the outside of the part body on the other hand,
   the first sensor being at least partially housed in the first cavity and the first cable being at least partially housed in the first conduit,
   the first sensor comprising a first membrane, the first pressor sensor being arranged so that at least a portion of the first membrane is part of the outer surface of the first pressure sensor,
   the part forming a vane of the aircraft turbomachine in which the first cavity is located in a leading edge of the vane;
   wherein the part further comprises a second pressure sensor and a third cable mechanically and electrically connected to the second pressure sensor, the part body comprising:
   a second cavity leading to the outside of the part body through a second opening, and
   a second conduit leading to the second cavity on the one hand and to the first conduit on the other hand,
   the second pressure sensor being at least partially housed in the second cavity and the third cable being partially housed in the second conduit and partially housed in a portion of the first conduit, and
   the second pressure sensor comprising a second membrane, the second sensor being arranged so that at least a portion of the second membrane is part of the outer surface of the second pressure sensor.

2. The part according to claim 1, further comprising a first grid located between the outside of the part body and the first pressure sensor.

3. The part according to claim 2, wherein the first cavity comprises an enlargement, the grid being received in the enlargement.

4. The part according to claim 1, wherein the part body is monobloc.

5. The part according to claim 1, comprising a protrusion, the first cavity being located at least partially in the protrusion.

6. The part according to claim 1, further comprising a second cable mechanically and electrically connected to the first pressure sensor, the second cable being at least partially housed in the first conduit.

7. The part according to claim 1, wherein the first conduit includes at least one curve or bend.

8. The part according to claim 1, wherein the part body has a dome shape, the second opening being inclined with respect to the first opening.

9. An aircraft turbomachine or a portion of an aircraft turbomachine comprising a part according to claim 1.

10. A part for an aircraft turbomachine comprising:
a first sensor comprising a first membrane, the first sensor being arranged so that at least a portion of the first membrane is part of the outer surface of the first sensor;
a first cable mechanically and electrically connected to the first sensor;
a part body including a first cavity leading to the outside of the part body through a first opening, and a first conduit leading to the first cavity on the one hand and to the outside of the part body on the other hand; and
a first grid located between the outside of the part body and the first sensor,
wherein the first cavity comprises an enlargement, the grid being received in the enlargement,
wherein the first sensor is at least partially housed in the first cavity and the first cable is at least partially housed in the first conduit, and
wherein the part forms a vane of the aircraft turbomachine in which the first cavity is located in a leading edge of the vane.

11. The part according to claim 10, wherein the first sensor includes a pressure sensor.

12. An aircraft turbomachine or a portion of an aircraft turbomachine comprising a part according to claim 10.

13. A part for an aircraft turbomachine comprising:
a first sensor comprising a first membrane, the first sensor being arranged so that at least a portion of the first membrane is part of the outer surface of the first sensor,
a first cable mechanically and electrically connected to the first sensor;
a part body including a first cavity leading to the outside of the part body through a first opening, and a first conduit leading to the first cavity on the one hand and to the outside of the part body on the other hand; and
a protrusion, the first cavity being located at least partially in the protrusion,
wherein the first sensor is at least partially housed in the first cavity and the first cable is at least partially housed in the first conduit, and
wherein the part forms a vane of the aircraft turbomachine in which the first cavity is located in a leading edge of the vane.

14. The part according to claim 13, wherein the first sensor includes a pressure sensor.

15. An aircraft turbomachine or a portion of an aircraft turbomachine comprising a part according to claim 13.

* * * * *